March 30, 1926.                                                    1,578,774
J. T. SMITH
HARROW AND PLOWING ATTACHMENT FOR CULTIVATORS
Filed March 14, 1925
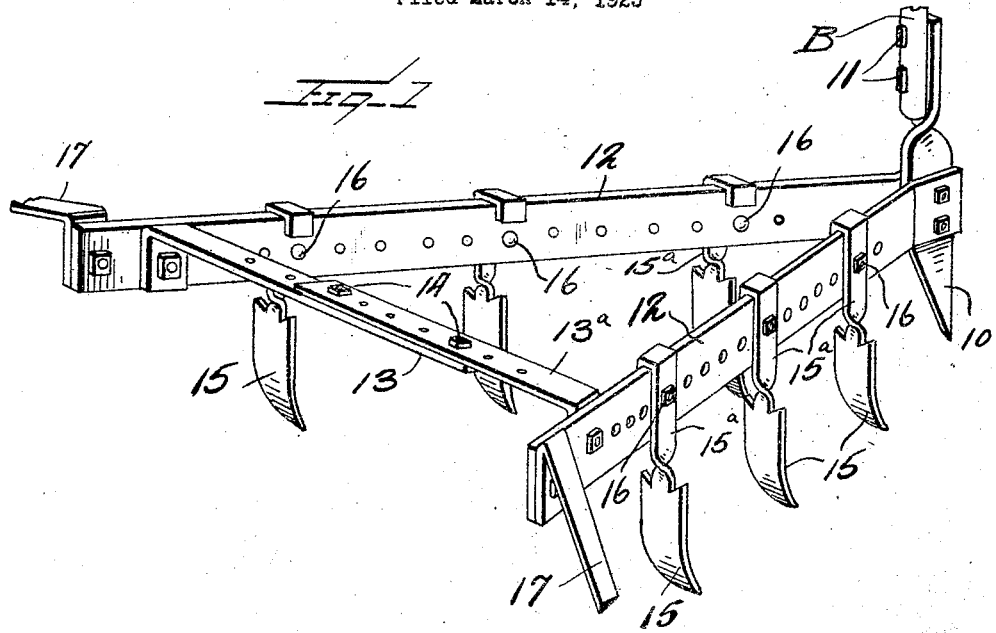
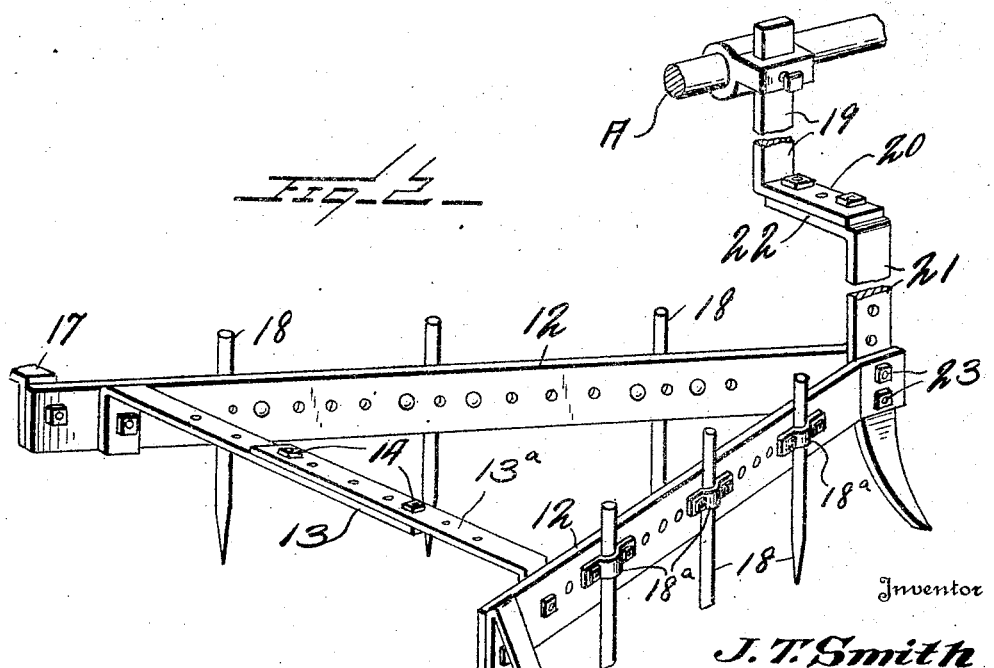
Inventor
J. T. Smith
By Watson E. Coleman
Attorney Patented Mar. 30, 1926.

1,578,774

UNITED STATES PATENT OFFICE.

JOHN T. SMITH, OF CAREY, TEXAS.

HARROWING AND PLOWING ATTACHMENT FOR CULTIVATORS.

Application filed March 14, 1925. Serial No. 15,570.

*To all whom it may concern:*

Be it known that I, JOHN T. SMITH, a citizen of the United States, residing at Carey, in the county of Childress and State of Texas, have invented certain new and useful Improvements in Harrowing and Plowing Attachments for Cultivators, of which the following is a specification, reference being had to the accompanying drawings.

This invention relates to cultivator attachments, and particularly to cultivator attachments having the form of harrows and plows adapted to be attached to the standards of a cultivator and take the place of the ordinary cultivating teeth or plows.

A further object is to provide a device of this character in which the frame supporting the plows or harrowing teeth is triangular in form and is adjustable to increase or decrease the width of the frame.

A still further object is to provide a device of this character in which either plow points or harrow teeth may be interchangeably used.

Another object is to provide a harrow or plow teeth supporting frame having weed cutting knives detachably connected to the frame.

Other objects will appear in the course of the following description.

My invention is illustrated in the accompanying drawings, wherein:—

Figure 1 is a perspective view of the cultivating attachment.

Figure 2 is a perspective view of the cultivating attachment with spikes substituted for plows;

Referring to these drawings, it will be seen that I have illustrated an ordinary or conventional riding cultivator having the rearwardly extending beams A and the standards B which may be of any suitable type. I have illustrated each of the beams as being provided with a standard B and this standard being of a type which is adjustable as to inclination. To this standard B there is attached a downwardly and forwardly extending member 10, which may be in the form of a relatively narrow plow point and which is fastened to the standard B by means of bolts 11.

Connected to this downwardly and forwardly extending point or member 10 is a triangular frame comprising the side pieces 12 and the rear cross piece 13. These side pieces 12 are so connected to each other at their forward end that the side pieces may be shifted into more or less divergent relation, and to this end they are loosely connected by bolts, as will be later described. The side pieces are connected at their rear ends by means of a brace formed of the sections 13 and 13ª, these sections overlapping each other and being perforated for the passage of bolts 14 whereby the sections may be held in their adjusted positions. The ends of the sections are bent downward and are bolted to the side pieces 12. It will be understood, of course, that a loose connection between the sections 13 and 13ª and the side pieces 12 will be sufficient to permit these side pieces to be fitted over each other to bring their apertures into alignment, as the side pieces 12 are shifted into different angular relations.

I have illustrated in Figure 1 plow points 15 as being mounted upon the side pieces 12 and I have illustrated these plow points as having shanks 15ª twisted with relation to the plow point, extending upward against the face of a side piece 12, and then extending over and downward upon the inside face of the side piece, these shanks being held in place upon the side pieces by means of bolts 16. I do not wish to be limited to this manner of fastening, but I have found that this permits the plow points to be readily removed and a greater or less number of plow points placed along the side pieces 12. It also permits the substitution of harrow teeth for these plow points. I have also illustrated as attached to the rear of the frame formed of the members 12 the outwardly and rearwardly projecting weed cutting knives 17. These knives may be set to different angles, as desired.

Where it is desired to harrow the ground, instead of using small plow points I provide harrow teeth 18 (see Figure 2) which are attached to the sides 12 of the frame by straps 18ª having bolts which pass through the apertures in the side pieces. It will be understood that these harrow teeth may be used in place of the plow points 15 and that more or less of these harrow teeth may be used and more or less of the plow points may be used.

In some cases it is desirable to set these cultivator frames formed of the members 12 and 13 laterally outward so as to space them a greater distance from each other than is necessary under other circumstances, and to that end I may provide an attachment shown in Figure 2 comprising a member 19 attached to one of the beams A of the cultivator, which member is angularly bent at its lower end, as at 20, and perforated. Coacting with this member 19 is a second angular member 21 having a foot 22 which bears against the angular portion 20 and is held thereto by means of the bolts. These two portions 20 and 22 may be adjusted upon each other to increase or decrease the distance between the cultivators. The member 21 in certain respects coincides with or is analogous to the member 10, as the harrow or plow frame formed of the members 12 and 13 is connected to the lower end of this member 21 just as it is connected to the lower end of the member 10 so that the frames will trail behind the cultivator. These members 10 and 21 each constitute a foot, as it may be termed, and the foot 10 and the member 21 applied in place of it for cultivating wide rows. I have illustrated the side beams 12 as being connected to the foot 10 or the foot 21 by means of transverse bolts 23, it being understood that these bolts may be loosened in order to permit a greater or less divergence of the side pieces 12.

By the substitution of member 21 for the foot 10, the harrows may be separated from each other a distance of twenty-four inches. The side pieces 12 of the frames may be separated from each other a distance from six inches up to thirty-six inches. The knives 17 may be removed or used as desired. The harrow, that is, the frames with the harrow teeth in them, are used to cultivate the soil, while the plow teeth 15 are used to cultivate growing crops of every kind. It will be obvious that from two to ten plow teeth can be used with the frames.

I claim:—

A cultivator attachment comprising a member adapted to be connected to a cultivator beam and extend downward therefrom, the member being laterally angled at its lower end and perforated, a second member having a laterally angled upper end adapted to be adjustably engaged with the angled lower end of the first named member, and a cultivating frame connected to the lower end of said second named member and having cultivating tools thereon and projecting downward therefrom.

In testimony whereof I hereunto affix my signature.

JOHN T. SMITH.